(12) United States Patent
Hettle et al.

(10) Patent No.: US 7,810,390 B2
(45) Date of Patent: Oct. 12, 2010

(54) PUSH IN TIRE VALVE STEM

(75) Inventors: Michael Hettle, Onsted, MI (US);
Jean-Christophe Deniau, Fenton, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 67 days.

(21) Appl. No.: 12/035,704

(22) Filed: Feb. 22, 2008

(65) Prior Publication Data

US 2008/0202659 A1    Aug. 28, 2008

Related U.S. Application Data

(60) Provisional application No. 60/903,265, filed on Feb. 23, 2007, provisional application No. 60/904,156, filed on Feb. 27, 2007, provisional application No. 60/931,511, filed on May 22, 2007.

(51) Int. Cl.
*B60C 23/02* (2006.01)
(52) U.S. Cl. ........................................... 73/146.8
(58) Field of Classification Search ................ 73/146.5
See application file for complete search history.

(56) References Cited

U.S. PATENT DOCUMENTS

| | | | |
|---|---|---|---|
| 6,005,480 A | 12/1999 | Banzhof et al. | |
| 6,722,409 B1 | 4/2004 | Martin | |
| 2004/0084124 A1 | 5/2004 | Martin | |
| 2005/0087007 A1* | 4/2005 | Uleski | 73/146 |
| 2006/0075812 A1 | 4/2006 | Luce | |
| 2006/0272758 A1 | 12/2006 | Yin et al. | |
| 2007/0062268 A1* | 3/2007 | Blossfeld et al. | 73/146.8 |
| 2007/0113637 A1* | 5/2007 | Blossfeld | 73/146.8 |
| 2007/0209432 A1* | 9/2007 | Rutherford | 73/146.8 |
| 2008/0173082 A1* | 7/2008 | Hettle et al. | 73/146.5 |

FOREIGN PATENT DOCUMENTS

| | | |
|---|---|---|
| DE | 19613936 | 10/1997 |
| WO | 03/002360 | 1/2003 |

OTHER PUBLICATIONS

International Search Report and Written Opinion dated Jun. 3, 2008.

* cited by examiner

*Primary Examiner*—Andre J Allen

(57) ABSTRACT

A tire pressure monitoring assembly includes a sensor secured to a valve stem secured within a wheel rim. The sensor is secured to the valve stem with a push on clip. The valve stem includes two pieces that provide for installation from one side of the wheel rim. The valve stem is separable to provide for the elongation of the rubber housing. Elongation of the housing causes a reduction in an outer diameter that provides for insertion into the opening of the wheel rim.

8 Claims, 4 Drawing Sheets

PUSH IN TIRE VALVE STEM

CROSS REFERENCE TO RELATED APPLICATION

The application claims priority to U.S. Provisional Application No. 60/903,265 filed on Feb. 23, 2007, U.S. Provisional Application No. 60/904,156 filed Feb. 27, 2007 and U.S. Provisional Application No. 60/931,511 filed May 22, 2007.

BACKGROUND OF THE INVENTION

This invention generally relates to tire pressure monitoring assembly and mounting method. More particularly, this invention relates to a valve assembly including separable valve stems and a clip secured sensor assembly.

Tire pressure monitoring sensors can be mounted to a tire valve stem. The sensor includes a weight that must be accommodated for in the mounting method. When the wheel is rotating the weight is acted on by centrifugal forces that can disrupt the desired position of the sensor. Further, movement of the sensor can be transmitted to the valve stem.

Accordingly, it is desirable to develop and design a valve stem and tire pressure monitoring mounting method that both eases assembly and accommodates forces encountered during operation.

SUMMARY OF THE INVENTION

An example tire pressure monitoring assembly includes a sensor secured to a valve stem secured within a wheel rim. The sensor is secured to the valve stem with a push on clip. The valve stem includes two pieces that provide for installation from one side of the wheel rim.

The sensor includes a housing for retaining the clip prior to engagement with the valve stem. The housing is pushed into valve stem until the clip engages a groove. A chamfered end spreads the clip so that it may guide along the outer surface of the valve stem until snapping into the groove.

The example valve stem assembly includes a first valve stem and a second valve stem that are both disposed within a rubber housing. The second valve stem is separable from the first valve stem to provide for the elongation of the rubber housing. Elongation of the housing causes a reduction in an outer diameter that provides for insertion into the opening of the wheel rim. The example valve stems provide for the complete assembly from one side of the wheel rim and a simply robust mounting arrangement for a tire pressure monitoring assembly.

These and other features of the present invention can be best understood from the following specification and drawings, the following of which is a brief description.

DETAILED DESCRIPTION OF THE PREFERRED EMBODIMENT

Figure 1:
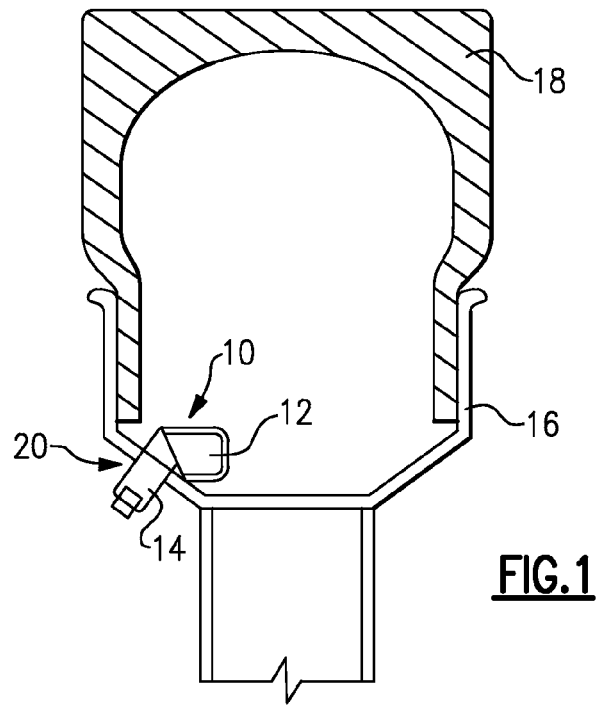
FIG. 1 is a schematic view of an example tire pressure monitoring assembly mounted within a tire.

Referring to FIG. 1, a tire pressure monitoring assembly 10 includes a sensor 12 secured to a valve stem assembly 14. The valve stem assembly 14 is secured within an opening 20 of a wheel rim 16. The wheel rim 16 supports a tire 18 as is known. The example tire pressure monitoring assembly 10 generates signals indicative of conditions within the tire 18.

Figure 2:
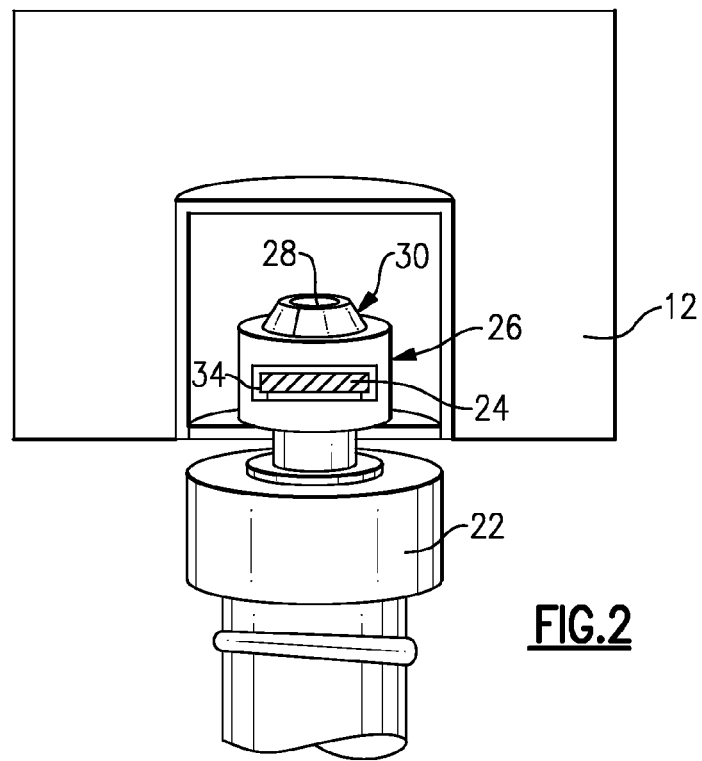
FIG. 2 is a schematic view of an example sensor secured to a valve assembly.

Referring to FIG. 2, the sensor 12 is secured to a valve stem 28 with a clip 24. The example clip 24 is retained within a retaining housing 26 of the sensor 12 until engaged with the valve stem 28. However, the clip 24 loosely fit within the retaining housing 26 to satisfy application specific requirements. The housing 26 includes a cavity 34 with openings for receiving the valve stem 28. The valve stem 28 is pushed into the cavity 34 until the clip 24 engages a groove on the valve stem 28. The valve stem 28 includes a chamfered end 30 that spreads the clip 24 so that it may guide along the outer surface of the valve stem 28 until snapping into a groove 32 (FIG. 4) on the valve stem 28.

Figure 3:
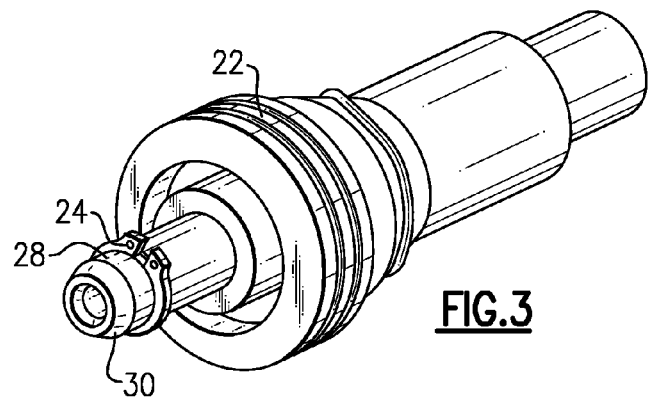
FIG. 3 is a perspective view of an example valve stem assembly including an example clip.
Figure 4:
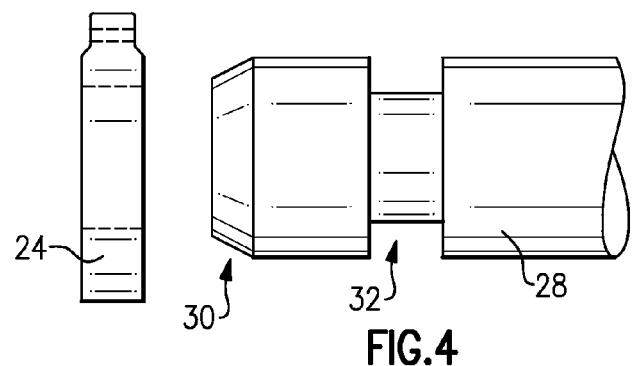
FIG. 4 is a schematic view of a portion of the example valve stem assembly.

Referring to FIGS. 3 and 4, the valve stem assembly 14 includes the rubber housing 22 that is received and retained within the opening 20 of the rim. The valve stem 28 extends from the housing 22 and includes the chamfered end 30 and the groove 32. The example clip 24 is a split ring that can spread apart in response to being driven over the chamfered end 30.

Figure 5:
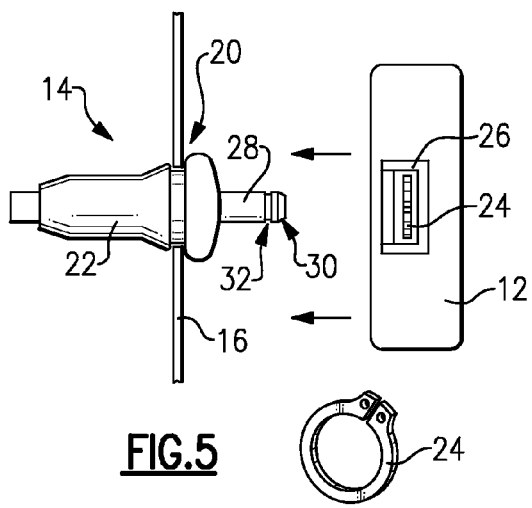
FIG. 5 is a schematic view prior to mounting of the sensor assembly to the example valve stem.

Referring to FIG. 5, once the valve stem assembly 14 is mounted within the opening 20 of the rim 16, the sensor 12 is mounted onto the valve stem 28. The housing 22 and clip 24 can be pre-assembled or post assembled. The clip 24 is retained within the cavity 34 over openings for the receiving the valve stem 28. The clip 24 spreads in response to engaging the chamfered end 30. The groove 32 is spaced a slight distance from the end of the valve stem 28 such that the chamfered end 30 can provide a gradual slope that does not require excessive force to spread the clip 24.

Figure 6:
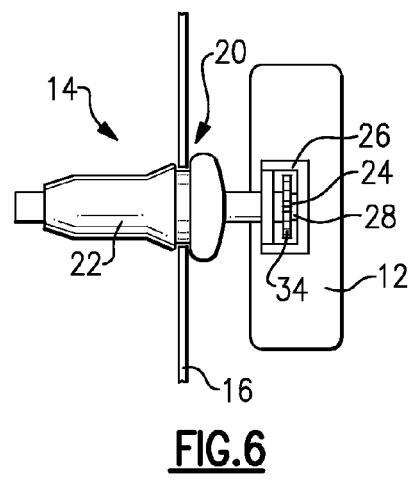
FIG. 6 is a schematic view of the sensor assembly mounted to the valve stem.

Referring to FIG. 6, once the clip 34 engages the groove 32, the sensor 12 is supported on the valve stem 28. The cavity 34 is of a size that prevents substantial play in the interface between the sensor 12 and the valve stem assembly 14. The cavity 34 includes an interior space not much bigger than the clip 24 to reduce play and relative movement of the sensor 12. Further, the cavity 34 can be keyed to the valve stem assembly 14 to set a relative radial position and maintain the desired radial position during operation.

Figure 7:
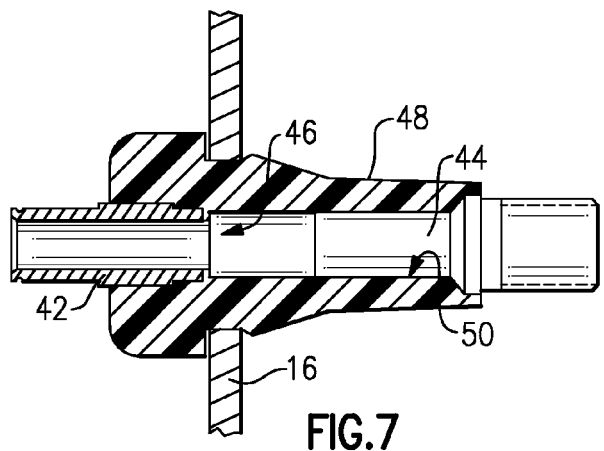
FIG. 7 is a cross-sectional view of an example valve stem assembly.

Referring to FIG. 7, an example valve stem assembly includes a first valve stem 42 and a second valve stem 44 that are both disposed within the rubber housing 48. The rubber housing 48 defines a bore 50 within which are the first and second valve stems 42, 44. The second valve stem 44 is separable from the first valve stem 44 to aid in assembly. The separable first and second valve stems 42, 44 provide for the elongation of the rubber housing 48. Elongation of the housing 48 in turn causes a reduction in an outer diameter that provides for insertion into the opening 20 of the wheel rim 16.

Figure 8:
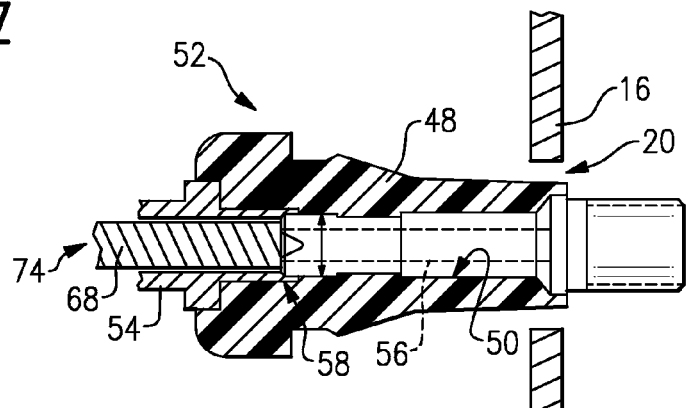
FIG. 8 is a cross-sectional view showing pre-insertion to the wheel rim with an insertion tool of an example valve stem.
Figure 8A:
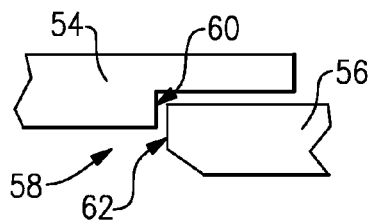
FIG. 8a is an enlarged view of an interface between the first and second valve stems.

Referring to FIGS. 8 and 8A, an example valve stem assembly 52 includes the rubber housing 48 that defines the bore 50. A first valve stem 54 is separable from a second valve stem 56 that are both disposed within the bore 50. An insertion tool 68 is extended through the first valve stem 54 to engage a face 62 of the second valve stem 56. Pushing against the second valve stem 56 through the first valve stem 54 provides for assembly and mounting of the valve stem assembly 52 from one side of the wheel rim 16.

The first valve stem 54 includes a shoulder 60 on which the face 62 of the second valve stem 56 seats. The shoulder 60 is disposed perpendicular to the bore 50 to provide a square straight interface 58 between the first and second valve stems 54, 56. The straight overlapping interface 58 substantially reduces relative movement between valves stems 54, 56. Further, the overlapping interface 58 provides a substantially solid member from one end of the elastic housing 48 straight through to an opposite end. The solid interface between the first and second valve stems 54, 56 reduces play caused by the weight of the sensor 12.

Figure 9:
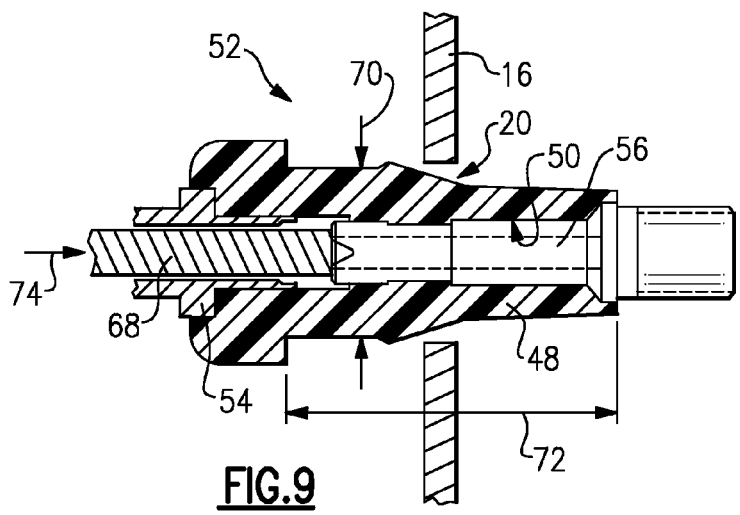
FIG. 9 is a cross-sectional view of the example valve stem shown in FIG. 8 being mounted to a wheel rim.

Referring to FIG. 9, the valve stem assembly 52 is illustrated during insertion through the opening 20. Pushing in the direction indicated at 74 causes the forward portion of the rubber housing 48 to contact the wheel rim 16. Further pushing unseats the second valve stem 56 from the first valve stem 54 and stretches the housing 48 to a length 72 greater than the normal relaxed length. The elongation of the housing 48 corresponds with a narrowing or neck down of the housing 48 to a reduced diameter 70. The reduced diameter 70 provides for receipt of the housing 48 through the opening 20.

Figure 10:
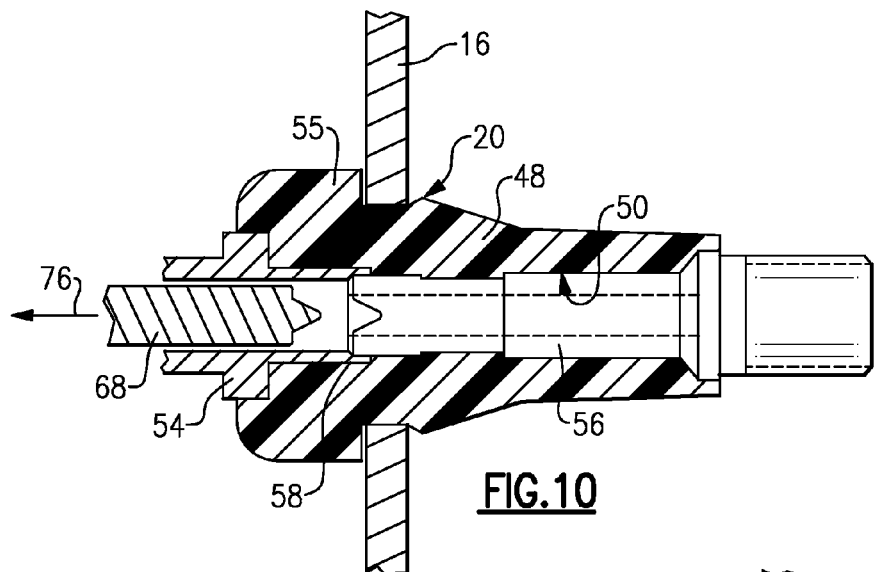
FIG. 10 is a cross-sectional view of the example valve stem mounted to the wheel rim.

Referring to FIG. 10 upon insertion through the opening 20, a flange 55 engages the rim 16 and a force on the insertion tool 68 increases. The increase in force beyond a desired range prompts release and withdrawal of the insertion tool 68. The insertion tool 68 is then moved rearward out of the bore 50. The release of force on the second insert 56 provides for the relaxing of the housing 48 to its original shape and configuration.

The housing 48 snaps back into the original shape and the second valve stem 56 reengages the first valve stem 54 and seats on the internal shoulder 60. The first valve stem 54 and the second valve stem 56 are biased against each other due to the elastic properties of the housing 48. The overlapped interface 58 prevents tilting movement of the second valve stem 56 to provide a substantially solid mating interface with the first valve stem.

Figure 11:
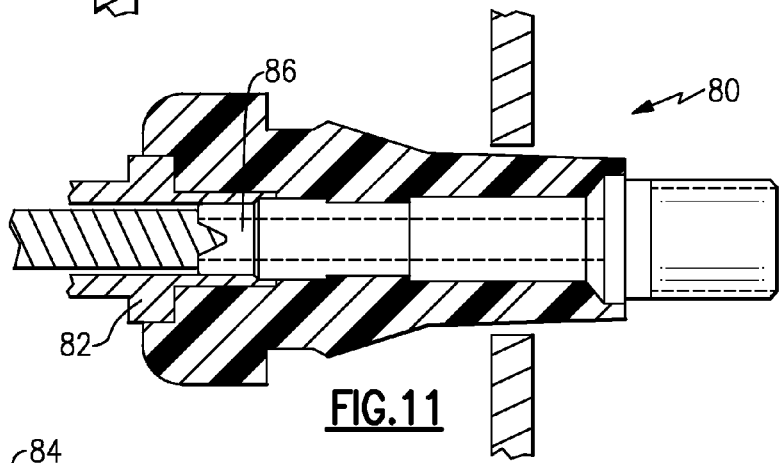
FIG. 11 is a cross-sectional view of another example valve stem assembly including an overlap between valve stem halves.
Figure 12A:
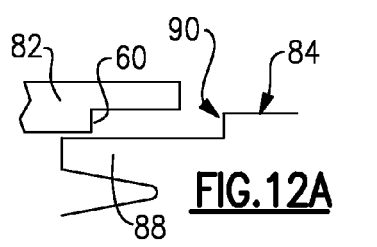
FIG. 12a is an enlarged view of the interface between the first and second valve stems.
Figure 12:
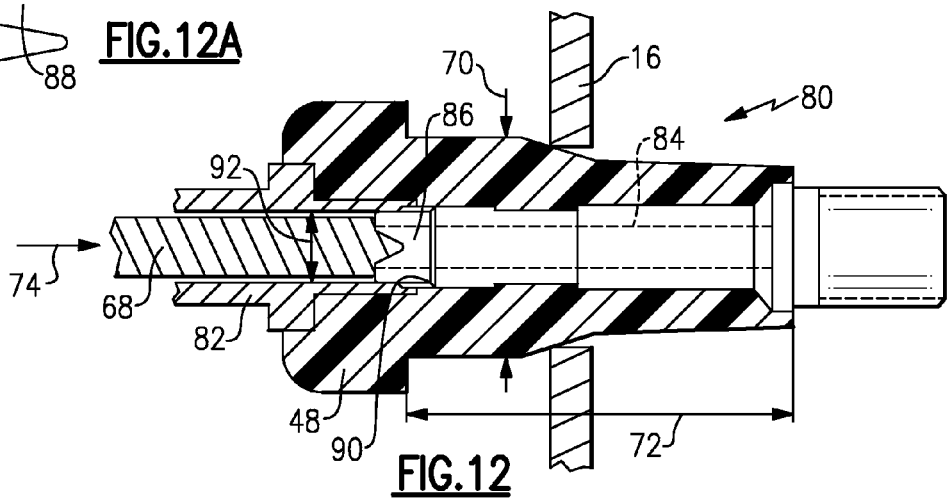
FIG. 12 is a cross-sectional view of the example valve stem being mounted to the wheel rim.

Referring to FIGS. 11, 12 and 12a, another example valve stem assembly 80 includes a first valve stem 82 and a second valve stem 84. The first valve stem 82 includes the shoulder 60 that engages a face 90 of the second valve stem 84. The second valve stem 84 includes an extension 88 that guides within a first diameter 92 of the first valve stem 82 to maintain the desired relative position between the first and second valve stems 82, 84. The extension 88 remains in contact with the first diameter 92 during insertion to maintain relative axial and radial alignment between the first and second valves stems 82, 84.

Referring to FIG. 12, with the insertion tool 68 engaged and pushing in the direction indicated at 74 the seat surface 90 is unseated from the shoulder 60. However, the extension 88 maintains radial contact with the first diameter 92. This contact maintains the desired radial alignment so that upon release of the insertion tool 68, the two valve stems 82 and 84 snap back into the desired alignment. The seat face 90 reseats onto the shoulder 60 to provide the solid positive contact between the first and second valve stems 82 and 84.

Accordingly the example valve stems provide for the complete assembly from one side of the wheel rim and a simply robust mounting arrangement for a tire pressure monitoring assembly.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A tire pressure monitoring sensor assembly comprising:
   an elastic housing including a bore;
   a valve stem disposed within the bore including a first end extending from the bore, wherein the first end includes a chamfered end and a groove on an outer circumferential surface of the valve stem and spaced apart from the first end;
   a sensor housing including a chamber including an opening for receiving the first end of the valve stem; and
   a clip held within the chamber and engageable to the groove on the outer circumference of the valve stem for securing the sensor housing to the valve stem.

2. The assembly as recited in claim 1, including a securing feature for retaining the clip within the chamber of the sensor housing prior to the clip engaging the valve stem.

3. The assembly as recited in claim 1, wherein the clip comprises a split clip expandable responsive to engaging the chamfered end of the valve stem.

4. The assembly as recited in claim 1 wherein the groove is disposed about an entire circumference of the valve stem.

5. The assembly as recited in claim 1, wherein the chamber includes an alignment features that corresponds to a feature on the valve stem to set a relative radial position between the valve stem and the sensor housing.

6. The assembly as recited in claim 1 wherein the opening in the chamber is a round opening providing a clearance fit for the outer circumference of the valve stem.

7. The assembly as recited in claim 1, wherein the chamber defines a space substantially the same size as the clip to reduce relative movement between the sensor housing and the valve stem.

8. The assembly as recited in claim 1, wherein the sensor housing is supported only on the valve stem once the clip is engaged to the groove.

* * * * *